(12) United States Patent
Bonizec et al.

(10) Patent No.: US 8,359,478 B2
(45) Date of Patent: Jan. 22, 2013

(54) PROTECTION OF A STATIC DATUM IN AN INTEGRATED CIRCUIT

(75) Inventors: Loïc Bonizec, Saint Maximin (FR); Stéphane Chesnais, Fuveau (FR)

(73) Assignee: STMicroelectronics S.A., Montrouge (FR)

( * ) Notice: Subject to any disclaimer, the term of this patent is extended or adjusted under 35 U.S.C. 154(b) by 1074 days.

(21) Appl. No.: 11/968,742

(22) Filed: Jan. 3, 2008

(65) Prior Publication Data

US 2008/0163371 A1 Jul. 3, 2008

(51) Int. Cl.
*G06F 12/14* (2006.01)

(52) U.S. Cl. .......... 713/189; 713/193; 713/194; 726/22; 711/103; 711/147; 709/213; 708/252; 708/492

(58) Field of Classification Search ............... 726/22; 709/213; 711/103, 147; 713/189, 193, 194; 708/252, 492
See application file for complete search history.

(56) References Cited

U.S. PATENT DOCUMENTS

| | | | | |
|---|---|---|---|---|
| 3,855,460 | A * | 12/1974 | Sado | 708/204 |
| 5,003,307 | A * | 3/1991 | Whiting et al. | 341/51 |
| 5,613,005 | A | 3/1997 | Murakami et al. | |
| 2002/0166058 | A1 | 11/2002 | Fueki | |
| 2008/0215798 | A1 * | 9/2008 | Sharon et al. | 711/103 |

OTHER PUBLICATIONS

French Search Report from corresponding French Application No. FR 07/52515, filed Jan. 3, 2007.
Schneier, B. "Alternating Stop-and-Go Generator" Applied Cryptography, Protocols, Algorithms, and Source Code in C, New York, John Wiley & Sons, US, 1996, pp. 383-385, ISBN: 0-471-11709-9.

* cited by examiner

*Primary Examiner* — Thanhnga B Truong
(74) *Attorney, Agent, or Firm* — Wolf, Greenfield & Sacks, P.C.

(57) ABSTRACT

A method and a system for protecting a static digital datum contained in a first element of an electronic circuit, intended to be exploited by a second element of this circuit, in which: on the side of the first element, the static datum is converted into a dynamic data flow by at least one first linear shift feedback register representing a different polynomial according to the value of the static datum; the dynamic flow is transmitted to the second element; and on the side of the second element, the received dynamic flow is decoded by at least one second shift register representing at least one of the polynomials that has been used by the first element.

23 Claims, 3 Drawing Sheets

PROTECTION OF A STATIC DATUM IN AN INTEGRATED CIRCUIT

BACKGROUND OF THE INVENTION

1. Field of the Invention

The present invention generally relates to electronic circuits and, more specifically, to integrated circuits comprising one or several elements of non-volatile storage of static data, that is, data which are not supposed to be modified. The present invention more specifically applies to the protection of such data against hacking attempts, and especially to flag-type data, that is, data which condition the integrated circuit operation by selection of an operating mode based on a limited number of bits.

2. Discussion of the Related Art

FIG. 1 very schematically shows in the form of blocks an example of an integrated electronic circuit 1 of the type to which the present invention applies. In this example, the circuit comprises a data processing unit 11 (for example, a central processing unit CPU), one or several memories 12 (MEM) among which at least one non-volatile memory element 13 (NVM). Other hardware or software functions may be added to circuit 1 and are symbolized in FIG. 1 by a block 14 (FCT). The different circuits internal to circuit 1 communicate together over one or several data, control, and address buses 15 as well as over direct links (supposed, for simplification, to be comprised in buses 15) between the different elements. Most often, circuit 1 communicates with the output via an input-output circuit 16 (I/O) connected to all or part of buses 15 and used as an interface between the inside and the outside of the circuit.

The present invention relates to the protection of data contained in one or several internal elements, typically of non-volatile storage, both against a discovery of these data and against a modification of their value to intervene on the integrated circuit operation. Such attacks are generally used to discover secret quantities (ciphering, identification or authentication key) or programs supposed to remain secret (specific algorithms). Most often, the attacker tries to switch the electronic circuit to a test mode operation which is in principle not accessible after the end of the manufacturing. Such an operating mode provides him an access to the data forbidden in user mode. More generally, the modification of a state provided by a non-volatile storage element may enable a person attempting fraud to exit a circuit protection program.

The non-volatile storage elements preferentially concerned by the present invention are, for example, elements of fuse type, of ROM type, or of EEPROM type which are supposed to contain static data.

The present invention more specifically aims at the protection of such data against so-called probe attacks, that is, intrusive actions on the circuit aiming at detecting or modifying the state of static data by a direct action.

FIG. 2 very schematically and partially illustrates an example of implementation of such an attack. The integrated circuit is partially shown in cross-section view to show its substrate 20 from which are formed the active areas (ACTIVE) of the circuits and upper conductive levels M1, M2, M3 in which are formed the interconnects between these circuits, as well as the contact recovery pads. In particular, buses 15 are formed in such interconnect levels, generally metallic.

When a datum is stored in static form (especially a fuse flag), a disadvantage as to the security of this datum is that it is visible by optical observation. To mask this visibility, a mechanical screen 21 formed of a last metallization level Mn placed on an insulating level 22 above the last interconnect level of the internal circuits is generally provided.

A probe attack comprises, for a person attempting fraud, eliminating all or part of protection screen 21, then contacting by means of one or several conductive probes p pads 27 or interconnect paths 15 formed in the underlying metallization levels. The other ends of the probes are connected to a measurement device 25 (MES) enabling either reading the state of the signal transiting on the interconnect conductor, or reversing this state. As indicated hereabove, such a reversal may enable exiting a protected operating mode to enter an operating mode enabling the attacker to then read, for example, by means of interface circuit 16, data supposed to remain inside the circuit.

The fuse elements are as buried as possible (for example, in first metallization level M1) to try being masked by interconnect conductors 15. In the case of EEPROM-type storage elements, said elements are formed in active portion 20 of the circuit and the states are available on the connections having these states transit to an element receiving these states (for example, unit 11 or a function 14) only in a reading.

However, the mere fact for the interconnects to be accessible for a probe contact may be sufficient for the attacker to detect or modify the state when read by other circuit functions.

SUMMARY OF THE INVENTION

The present invention aims at overcoming all or part of the disadvantages of known integrated circuits for protecting static data.

The present invention more specifically aims at the protection of static data against attacks under conductive probes.

The present invention also aims at the protection of static data over a small number of bits and conditioning an operating mode of the integrated circuit.

The present invention also aims at protecting the static data during their transfer from an internal element to another internal element of the electronic circuit against a value detection or modification.

To achieve all or part of these objects, as well as others, the present invention provides a method for protecting a static digital datum contained in a first element of an electronic circuit and intended to be exploited by a second element of this circuit, in which:

on the side of the first element, said static datum is converted into a dynamic data flow by at least one first linear feedback shift register representing a different polynomial according to the value of said static datum;

the dynamic flow is transmitted to the second element; and on the side of the second element, the received dynamic flow is decoded by at least one second shift register representing at least one of the polynomials that have been used by the first element.

According to an embodiment of the present invention, a feedback of the second register is replaced with the received dynamic flow.

According to an embodiment of the present invention, the second register is a linear feedback shift register.

According to an embodiment of the present invention, a same first linear feedback shift register is used on the side of the first element to convert a static datum bit, this register representing a polynomial selected from among two polynomials of same degree according to the state of said bit.

According to an embodiment of the present invention, the state of said static datum modifies the coefficients of the polynomial represented by the first linear feedback shift register.

According to an embodiment of the present invention, the dynamic flow received by the second element and the output of the second shift register are compared to determine the state of the static datum.

The present invention also provides a system for protecting a static datum contained in a first element of an electronic circuit against an attack by contact, comprising:

at least one first static-to-dynamic conversion linear feedback shift register before provision of the datum over an interconnect link towards a second element receiving this datum; and at least one second shift register of linear feedback type to perform the reverse conversion on the side of the second element.

According to an embodiment of the present invention, a comparator compares an output of the second register with a flow provided by the first register.

According to an embodiment of the present invention, the first linear feedback shift register is parameterizable according to the polynomial that it represents according to the value of the static datum to be converted.

According to an embodiment of the present invention, the second shift register represents one of the polynomials represented by the first register.

According to an embodiment of the present invention, a feedback of the second register receives a dynamic flow provided by the first register.

According to an embodiment of the present invention, the second register is a linear feedback shift register.

The present invention also provide a circuit for storing a static datum in an electronic circuit, comprising:

an element for storing the datum; and a circuit of static-to-dynamic conversion of this datum by a linear feedback shift register representing a different polynomial according to the value of the datum.

The present invention also provides a circuit receiving a static datum of an electronic circuit contained in a storage circuit integrated to the same electronic circuit, comprising at least one shift register of dynamic-to-static conversion of a dynamic data flow received at the input of the receiver circuit.

The foregoing and other objects, features, and advantages of the present invention will be discussed in detail in the following non-limiting description of specific embodiments in connection with the accompanying drawing.

DETAILED DESCRIPTION

Figure 1:
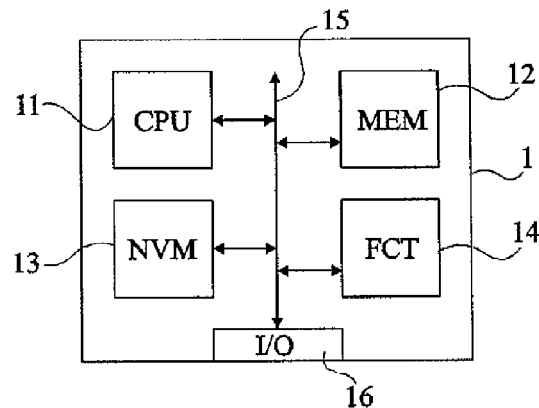
FIG. 1, previously described, very schematically shows in the form of blocks an integrated electronic circuit of the type to which the present invention applies as an example.

The same elements have been designated with the same reference numerals in the different drawings. For clarity, only those steps and elements which are useful to the understanding of the present invention have been shown and will be described. In particular, the exploitation that is made of the static data protected by the implementation of the present invention has not been detailed, the present invention being compatible with any conventional exploitation of such static data, especially to condition the circuit operation.

A feature of an embodiment of the present invention is to convert a signal, in principle static, which needs to transit within the integrated circuit between two internal elements thereof, into a dynamic signal.

Figure 3:
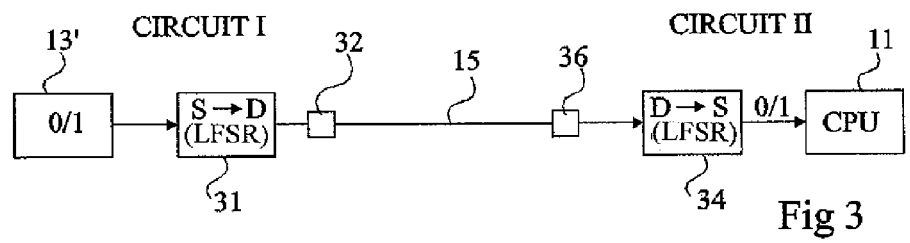
FIG. 3 very schematically shows in the form of blocks an embodiment of a protection system according to the present invention.

FIG. 3 very schematically shows in the form of blocks an embodiment of an architecture or of a system for transferring static signals between two internal circuits CIRCUIT I and CIRCUIT II of a same integrated circuit.

To simplify the following description, reference will be made to static data stored in the form of a single bit capable of taking two states 0 or 1, but all that will be discussed hereafter also applies to static data over several bits at the cost of a duplication of the devices or, as will be seen hereafter, by increasing their parameterizing capacity.

Figure 2:
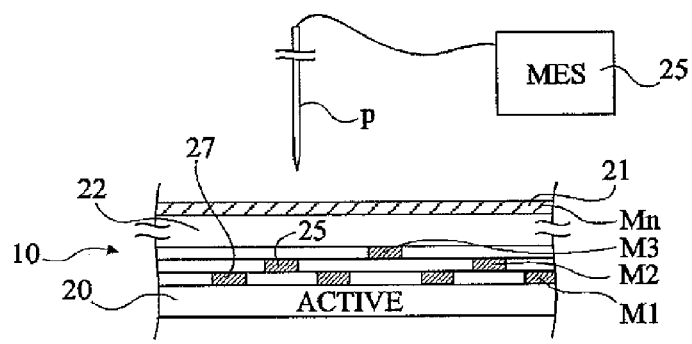
FIG. 2, previously described, illustrates a probe attack more specifically aimed at by the present invention.

In the example of FIG. 3, circuit 1 is supposed to comprise a non-volatile storage element 13' of fuse, ROM or EPROM type storing a bit of value 0 or 1. Element 13' containing the static datum is associated with a static-to-dynamic conversion circuit 31 (S->D) having a linear feedback shift register (LFSR) with a serial output connected to a contact-recovery conductive pad 32 for interconnection to the inside of integrated circuit 10. The assembly of element 13' and circuit 31 forms a storage circuit CIRCUIT I accessible by pad 32 for the interconnects. Pad 32 corresponds to the same type of pad as pad 27 (FIG. 2). Pad 32 is connected, for example, to bus conductors 15 to be received by another internal element (for example, a processing unit 11). A dynamic-to-static conversion circuit 34 (D->S), also based on an LFSR register, is interposed between an input pad 36 connected to connection 15 and element 11. The assembly of circuit 34 and element 11 forms a circuit CIRCUIT II receiving the static datum. Pad 36 is connected, as will be seen hereafter, on the feedback loop of a linear feedback shift register of circuit 34 to decode the dynamic data flow sent by register 31 and provide value 0 or 1 corresponding to the value of the static datum. The receiver element, as well as the transmitter element, may as a variation be any processing or storage element.

The implementation of the present invention requires modifying the inputs/outputs of the internal circuits between which the static data transfer is desired to be protected. On the one hand, a linear feedback shift register 31 is interposed between the storage element (for example, the transistor of the ROM element) and its pad 32 of contact transfer to the interconnect levels. On the other hand, a shift register 34 needs to be provided between input pad 36 of the receiving circuit and such conventional internal circuits of exploitation of the static datum.

Linear feedback shift registers being formed in the active areas of the integrated circuit, of the other active elements with which they are respectively associated, are not detectable by a probe attack.

Figure 4:
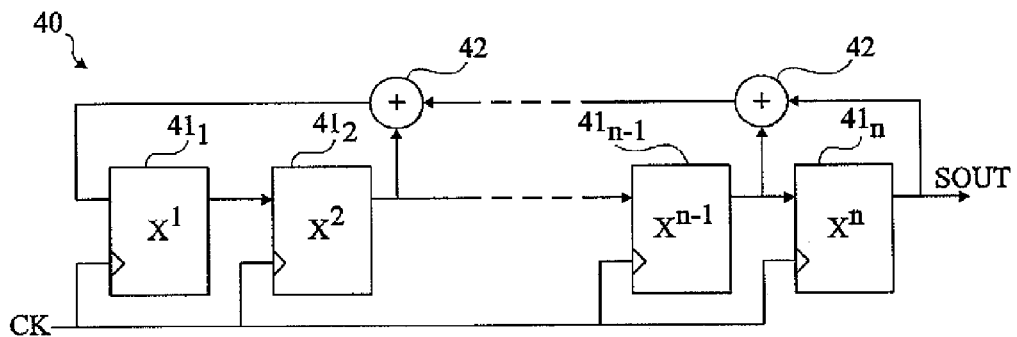
FIG. 4 very schematically shows in the form of blocks a linear feedback shift register.

FIG. 4 schematically shows in the form of blocks an example of the architecture of a linear feedback shift register 40. Such a register is formed of a succession of flip-flops $41_1$, $41_2$, ... $41_{n-1}$, and $41_n$ in series (the outputs of a flip-flop of preceding rank being connected to the data input of the flip-flop of next rank). The output of last flip-flop $41_n$ is looped back onto the input of the first one $41_1$ and one or several adders 42 are interposed on the response path to combine the response bit with some flip-flop outputs (in this example, the output of flip-flop $41_2$ and of flip-flop $41_{n-1}$).

The function of a LFSR register is to represent, by the number of flip-flops and by the number and the positions of the adders, a polynomial of expression $1 + \alpha_1 \cdot X^1 + \alpha_2 \cdot X^2 + \ldots + \alpha_{n-1} \cdot X^{n-1} + \alpha_n \cdot X^n$. Degree n of the polynomial is defined by the number of flip-flops and its coefficients $\alpha$ are defined as having values 0 or 1 according to whether the output of the flip-flop representing the corresponding degree is or not combined with the feedback.

The flip-flops are all synchronized by the same clock signal CK and either a serial output is used by sampling output SOUT of one of the flip-flops (for example, the last one $X^n$), or several outputs of the flip-flops are used in parallel to form a parallel data word.

Functionally, an LFSR register is a shift register having an input bit which is a linear function of its previous states.

Such registers are generally used in cryptography or in data transmission to cipher the transmitted data or to generate random numbers.

In such applications, the polynomials represented by the registers are generally selected to be primitive polynomials which have, among others, as properties that the reciprocal polynomial also forms a primitive polynomial.

In ciphering applications, the bits of the ciphering key are introduced in parallel on the respective register flip-flop inputs. The ciphered data are then obtained by sampling all the flip-flop outputs in parallel or by sampling serial output SOUT. The key plays on the polynomial seed, that is, sets value X at a given time.

A property of linear feedback shift registers is that by introducing data flow SOUT on an identical register (representing the same polynomial) and by providing it with the same key, the respective flip-flop outputs provide the original datum on the outputs of the different flip-flops. This enables a deciphering.

In an application to the generation of random numbers, it is not necessary to introduce data into the register, the mere fact of having it rotate by means of the clock signal outputs a bit flow which has a sufficiently long repetition cycle to appear as random.

Most often, it is tried to represent so-called maximum polynomials, that is, having, for a given degree, as long a repetition cycle as possible. To achieve this, the number of coefficients $\alpha$ at state 1 must be odd, knowing that degrees 0 and n of the polynomial are necessarily present. This amounts to saying that there must be an odd number of combinations on the register response path.

The example of FIG. 4 relates to an so-called external LFSR register embodiment in which the adders are placed on the response path. Another LFSR register family provides placing the combination elements between the actual flip-flops. Such registers are then called internal LFSR registers.

The present invention provides, in the application to the conversion of static data into dynamic data within an integrated circuit, modifying the polynomial coefficients according to the state of the bit of the datum to be masked. With a register defining a primitive polynomial (maximum or not), if the serial flow is provided at the input of the response (instead of providing the output signal of its last flip-flop) of the LFSR reception register representing the same polynomial, the output of this reception register (output of its last flip-flop) is then equal to the input. Similarly, the output of the last flip-flop of a linear feedback shift register representing the same polynomial as that having coded the datum to be masked is identical to the serial flow delayed by one cycle.

Figure 5:
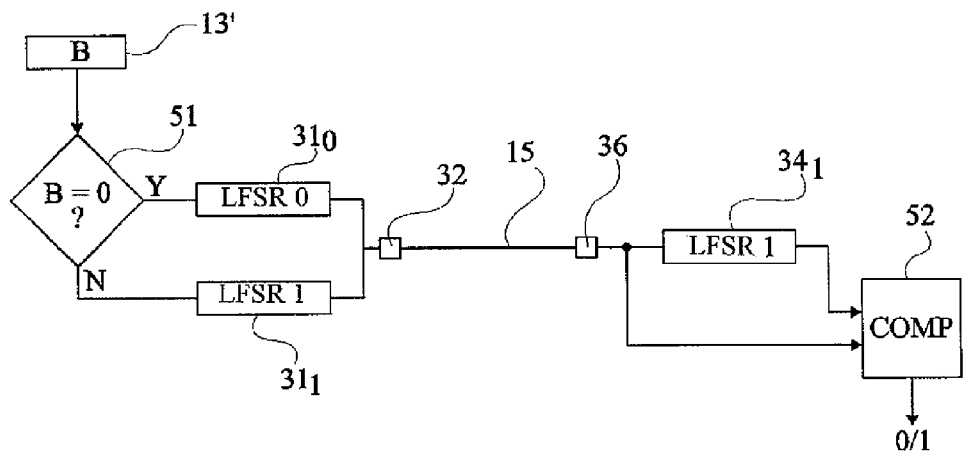
FIG. 5 illustrates an embodiment of the protection method according to the present invention.

FIG. 5 shows a simplified functional diagram illustrating an embodiment of the protection method according to the present invention. A bit B to be protected is contained in a storage element 13' of a first internal circuit CIRCUIT I. On reading of this bit, its state is tested (block 51, B=0 ?). According to this state, the circuit activates a first $31_0$ (LFSR 0) or a second $31_1$ (LFSR 1) LFSR register. It will be seen hereafter than in practice, the same register can be configured differently according to the state of the input bit. The outputs of registers $31_0$ and $31_1$ are connected to pad 32 so that the dynamic bit flow transits through interconnect 15 to input pad 36 of the circuit intended to receive the static datum. The bit flow is sent to a register $34_1$ (LFSR 1) defining the same polynomial as one of the two transmit registers $31_0$ and $31_1$. The serial output of register $34_1$ is compared in block 52 (COMP) with the input flow sampled from pad 36 and this comparison enables determining static state 0 or 1 of bit B. Indeed, if the polynomial represented by register $34_1$ is identical to that used for the static-to-dynamic conversion, its output flow and the input flow are identical. Accordingly, it is enough to verify that a bit-to-bit comparison between the output and the input provides an invariant result to determine, in receive mode, which polynomial is used in transmission, and thus the state of the sent bit.

Figure 6:
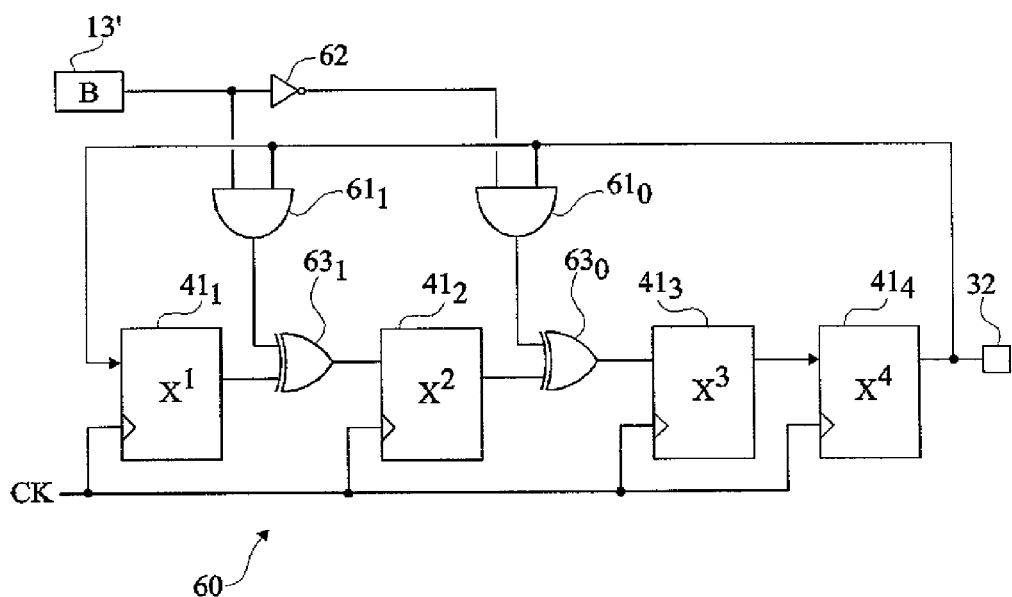
FIG. 6 is an electric diagram of an embodiment of a protection device according to the present invention, on the side of the internal element storing the data.

FIG. 6 shows an embodiment of a static-to-dynamic conversion circuit 60 according to an embodiment of the present invention. In this example, an LFSR register of degree 4 respecting an internal architecture (adders between the flip-flops) is provided. Circuit 60 is capable of defining two different polynomials of order 4 according to the state of bit B. For this purpose, element 13' is connected to a first input of an AND-type gate $61_1$ and, by an inverter 62, to a first input of a second AND-type logic gate $61_0$. The second respective inputs of gates $61_0$ and $61_1$ are connected to the direct response path between the last flip-flop $41_4$ and first flip-flop $41_1$. The output of first flip-flop $41_1$ crosses an adder (XOR gate) $63_1$ having its output connected to the input of flip-flop $41_2$. The output of flip-flop $41_2$ is sent to a first input of an XOR-type gate $63_0$ having its output connected to the input of flip-flop $41_3$. The second respective inputs of gates $63_0$ and $63_1$ receive the outputs of gates $61_0$ and $61_1$. The clock inputs of all the flip-flops receive the same clock signal CK and, according to the nature of the used flip-flops, are also capable of receiving a reset signal (not shown).

If bit B is at state 0, gate $61_1$ outputs a state 0 whatever the state of the bit transiting on the feedback loop. However, gate $61_0$ is activated by the inversion of the state of bit B so that adding function $63_0$ is active in the polynomial. The primitive polynomial thus defined is $1 + X^2 + X^4$.

If the state of bit B is 1, gate $61_0$ is always blocked while gate $61_1$ activates adding function $63_1$. Accordingly, the polynomial then shown is $1 + X + X^4$.

The flow sent onto pad 32 is sampled, for example, from the output of last flip-flop $41_4$.

Figure 7:
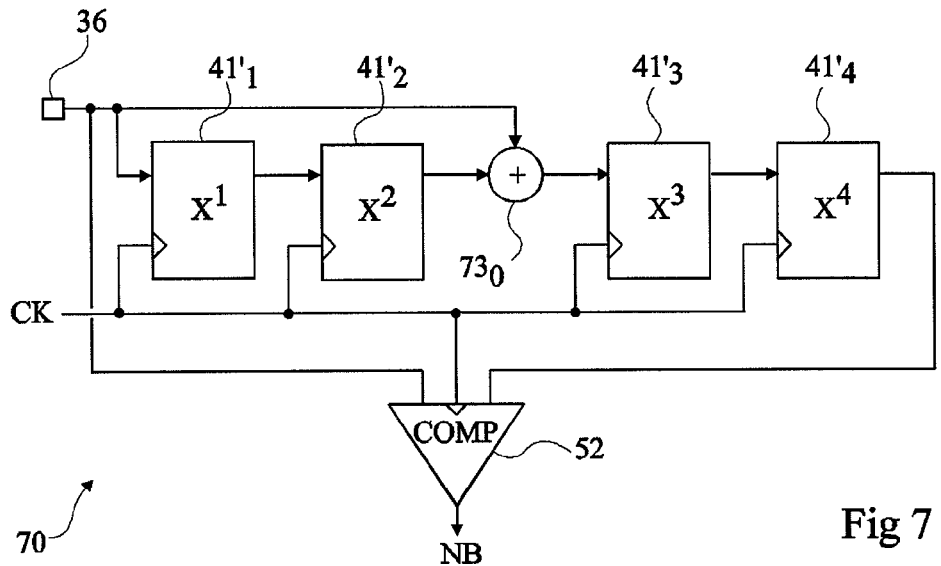
FIG. 7 shows a first embodiment of a circuit for decoding data received by an internal receiver element according to the present invention.

FIG. 7 shows a first embodiment of a decoding circuit 70 on the receiver circuit side before exploiting the static datum.

Circuit 70 comprises a register of LFSR type representing one of the two polynomials of transmit circuit 60. In this example, the representation of polynomial $1+X^2+X^4$ is assumed to be formed of four flip-flops $41'_1$ to $41'_4$ and of an adder $73_0$ between flip-flops $41'_2$ and $41'_3$.

Pad 36 receiving the flow to be decoded is connected on the one hand to the input of first flip-flop $41'_1$ and on the other hand to one of the inputs of adder $73_0$, which amounts to replacing the register feedback (output of flip-flop $41'_4$) with the input flow provided by the transmit circuit. The output of last flip-flop $41'_4$ and the input signal (terminal 36) are sent onto inputs of a comparator 52 clocked by clock signal CK. If the two comparator inputs are always identical, then the LFSR register is that used in the transmission. In the example, comparator 52 provides the inverse state NB of the state sent by the transmit circuit. Comparator 52 provides the inverse state since the shift register represents polynomial $1+X^2+X^4$, which corresponds to the coding of a zero by the circuit of FIG. 6.

If the starting of the coding and decoding (transmit and receive) registers is synchronized, that is, if the register of circuit 70 is reset at the same time as the register of circuit 60, the result is interpretable with no delay. In the opposite case (if the register of circuit 70 is started on reception of the flow), the state provided by comparator 52 is interpretable at the end of a number of clock cycles corresponding to the degree of the polynomial.

Figure 8:
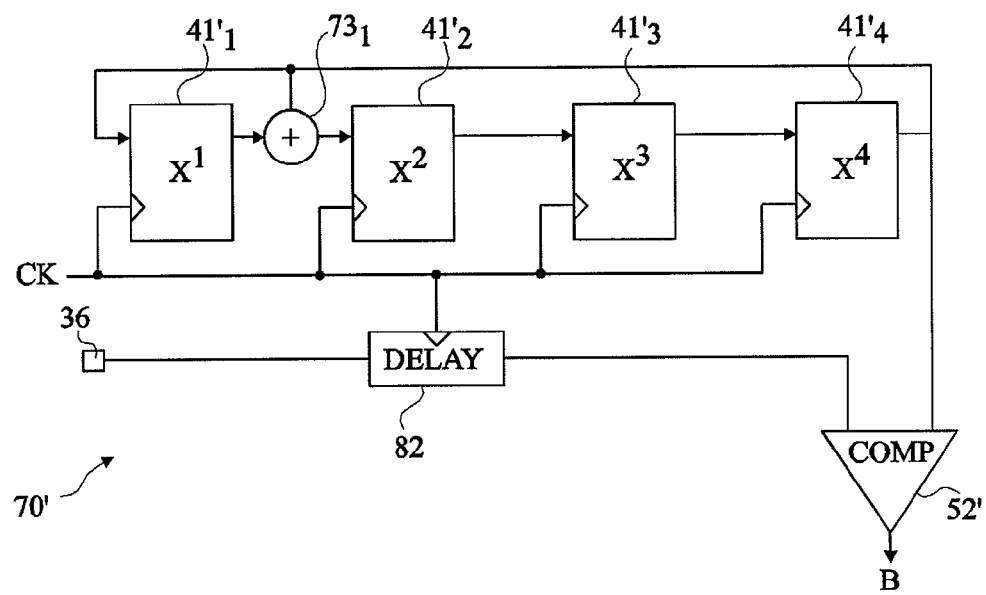
FIG. 8 shows a second embodiment of a circuit for decoding data received by an internal receiver element according to the present invention.

FIG. 8 shows a second embodiment of a dynamic-to-static device 70' according to the present invention. In this example, the linear shift feedback register represents polynomial $1+X+X^4$ to directly decode the state of bit B of FIG. 6 (an adder $73_1$ being interposed between flip-flops $41'_1$ and $41'_2$). Another difference with respect to the decoder of FIG. 7 is that the feedback of the LFSR register is not modified.

In this embodiment, input 36 of the flow to be decoded is connected to a first input of a comparator 52' after crossing a delay element 82 introducing a delay, for example, of one clock cycle. A second input of comparator 52' is connected to the output of last flip-flop $41'_4$. Comparator 52' provides the result of bit B. If the input flow has been generated from the same polynomial, comparator 52' provides an invariant state.

If circuit 70' is synchronized with circuit 60, the result is interpretable as soon as element 82 provides a state. Otherwise, it is interpretable from a number of cycles at least equal to the degree of the polynomial plus one. The delay introduced by element 82 is then selected, for example, to be at least equal to the degree of the polynomial plus one.

Of course, other embodiments than those illustrated in FIGS. 6 and 8 may be provided to respect the corresponding functionalities. Similarly, the degree of the selected polynomials depends on the embodiments and, in particular, on the robustness desired for the dynamic signal. The starting of decoding circuit 70 or 70' may be periodic (for example, every second) to periodically check the state of the static datum.

If a datum of more than one bit is desired to be converted, either one device per bit and as many transmission lines as there are bits may be provided, or the polynomial of transmit LFSR register may be made parameterizable among $2^k$ polynomials by an adapted combinational logic, where k represents the number of bits of the datum. On the receive side, a dynamic-to-static conversion circuit comprising the $2^k$ possible polynomials are then preferentially used to obtain the detection result.

Of course, the present invention is likely to have various alterations, modifications, and improvements which will readily occur to those skilled in the art. In particular, the practical implementation of the present invention based on the functional indications given hereabove are within the abilities of those skilled in the art by using electronic components conventional per se.

Further, the adaptation of the inputs/outputs of the static data storage circuits and of the circuits for interpreting these data is also within the abilities of those skilled in the art. It should however be noted that since the present invention more specifically applies to protecting the data against probe attacks, this results, at least on the transmit side, in a hardware implementation (where the decoding may be performed in software fashion).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting a static digital datum contained in a first element of an electronic circuit and intended to be exploited by a second element of this circuit, wherein:

on the side of the first element, said static digital datum is converted, in a first circuit internal to the electronic circuit, into a dynamic data flow by at least one first linear feedback shift register, wherein the at least one first linear feedback shift register, in response to a first state of said static digital datum, represents a first polynomial and generates the dynamic data flow based on the first polynomial and wherein the at least one first linear feedback shift register, in response to a second state of said static digital datum, represents a second polynomial and generates the dynamic data flow based on the second polynomial;

the dynamic data flow is transmitted to the second element; and on the side of the second element, the dynamic data flow is decoded, in a second circuit internal to the electronic circuit, by at least one second linear feedback shift register representing at least one of the polynomials likely to have been used by the first element.

2. The method of claim 1, wherein a feedback of the second linear feedback shift register is replaced with the received dynamic data flow.

3. The method of claim 1, wherein a same first linear feedback shift register is used on the side of the first element to convert the static digital datum, this linear feedback shift register representing a polynomial selected from among two polynomials of same degree according to the state of said static digital datum.

4. The method of claim 1, wherein the state of said static digital datum modifies the coefficients of the polynomial represented by the first linear feedback shift register.

5. The method of claim 1, wherein the dynamic data flow received by the second element and the output of the second linear feedback shift register are compared to determine the value of the static digital datum.

6. A system for protecting a static datum contained in a first element of an electronic circuit against an attack by contact, comprising:

at least one first static-to-dynamic conversion linear feedback shift register configured to convert, in a first circuit internal to the electronic circuit, the static datum to a dynamic data flow and to provide the dynamic data flow over an interconnect link to a second element receiving this static datum, wherein the at least one first linear feedback shift, in response to a first state of the static datum to be converted, represents a first polynomial and generates the dynamic data flow based on the first polynomial and wherein the at least one first linear feedback shift register, in response to a second state of the static datum to be converted, represents a second polynomial and generates the dynamic data flow based on the second polynomial; and at least one second linear feedback shift register to perform, in a second circuit internal to the electronic circuit, a reverse conversion of the dynamic data flow at the second element.

7. The system of claim 6, wherein a comparator compares an output of the second linear feedback shift register with a flow provided by the first linear feedback shift register.

8. The system of claim 6, wherein the second linear feedback shift register represents one of the polynomials represented by the first linear feedback shift register.

9. The system of claim 6, wherein a feedback of the second linear feedback shift register receives a dynamic flow provided by the first linear feedback shift register.

10. A method for protecting a static datum in an integrated circuit, comprising:

converting, by a first circuit internal to the integrated circuit, a value of the static datum into a dynamic data flow using at least one first linear feedback shift register, wherein the at least one first linear feedback shift register, in response to a first state of the static datum to be converted, represents a first polynomial and generates the dynamic data flow based on the first polynomial and wherein the at least one first linear feedback shift register, in response to a second state of the static datum to be converted, represents a second polynomial and generates the dynamic data flow based on the second polynomial;

transmitting, by the first circuit, the dynamic data flow from the first circuit to a second circuit internal to the integrated circuit; and decoding, by the second circuit, the dynamic data flow to provide the value of the static datum.

11. A method as defined in claim 10, wherein converting the value of the static datum includes modifying feedback of the at least one first linear feedback shift register according to the value of the static datum.

12. A method as defined in claim 10, wherein converting the value of the static datum includes generating the dynamic data flow using one linear feedback shift register in response to the first value of the static datum and generating the dynamic data flow using another linear feedback shift register in response to the second value of the static datum.

13. A method as defined in claim 10, wherein decoding the dynamic data flow includes using a second linear feedback shift register.

14. A method as defined in claim 10, wherein decoding the dynamic data flow includes applying the dynamic data flow to a second linear feedback shift register and to a first input of a comparator, applying an output of the second linear feedback shift register to a second input of the comparator, and determining the value of the static datum based on the output of the comparator.

15. A method as defined in claim 14, wherein decoding the dynamic data flow further includes replacing the feedback of the second linear feedback shift register with the dynamic data flow.

16. A method as defined in claim 14, wherein the dynamic data flow is delayed before application to the first input of the comparator.

17. A method as defined in claim 10, wherein the coefficients of a polynomial represented by the at least one first linear feedback shift register are modified according to the value of the static datum.

18. A method as defined in claim 10, wherein decoding the dynamic data flow includes applying the dynamic data flow to a second linear feedback shift register in the second circuit and comparing the dynamic data flow to the output of the second linear feedback shift register to determine the value of the static datum.

19. A system for protecting a static datum in an integrated circuit, comprising:

a first circuit internal to the integrated circuit configured to convert a value of the static datum to a dynamic data flow using at least one first linear feedback shift register, wherein the at least one first linear feedback shift register, in response to a first state of the static datum to be converted, represents a first polynomial and generates the dynamic data flow based on the first polynomial and wherein the at least one first linear feedback shift register, in response to a second state of the static datum to be converted, represents a second polynomial and generates the dynamic data flow based on the second polynomial; and a second circuit internal to the integrated circuit configured to receive the dynamic data flow from the first circuit and to decode the dynamic data flow to determine the value of the static datum.

20. A system as defined in claim 19, wherein the first circuit is configured to modify feedback of the at least one first linear feedback shift register according to the value of the static datum.

21. A system as defined in claim 19, wherein the second circuit includes a second linear feedback shift register and a comparator, wherein the dynamic data flow is applied to the second linear feedback shift register and to a first input of the comparator, and the output of the second linear feedback shift register is applied to a second input of the comparator, the value of the static datum being indicated by the output of the comparator.

22. A system as defined in claim 21, further comprising a delay element to delay the dynamic data flow before application to the first input of the comparator.

23. A system as defined in claim 19, wherein the first circuit is configured to modify the coefficients of a polynomial represented by the at least one first linear feedback shift register according to the value of the static datum.

* * * * *

UNITED STATES PATENT AND TRADEMARK OFFICE
CERTIFICATE OF CORRECTION

PATENT NO. : 8,359,478 B2  
APPLICATION NO. : 11/968742  
DATED : January 22, 2013  
INVENTOR(S) : Loïc Bonizec et al.

Page 1 of 1

It is certified that error appears in the above-identified patent and that said Letters Patent is hereby corrected as shown below:

On the title page, Item (30) should read:  
(30)   Foreign Application Priority Data  
Jan. 3, 2007 (FR).................. 07/52515

Claim 6, col. 8, line 67, should read:  
feedback shift register, in response to a second state of said static Signed and Sealed this  
Nineteenth Day of March, 2013

Teresa Stanek Rea  
*Acting Director of the United States Patent and Trademark Office*